Patented Sept. 15, 1936

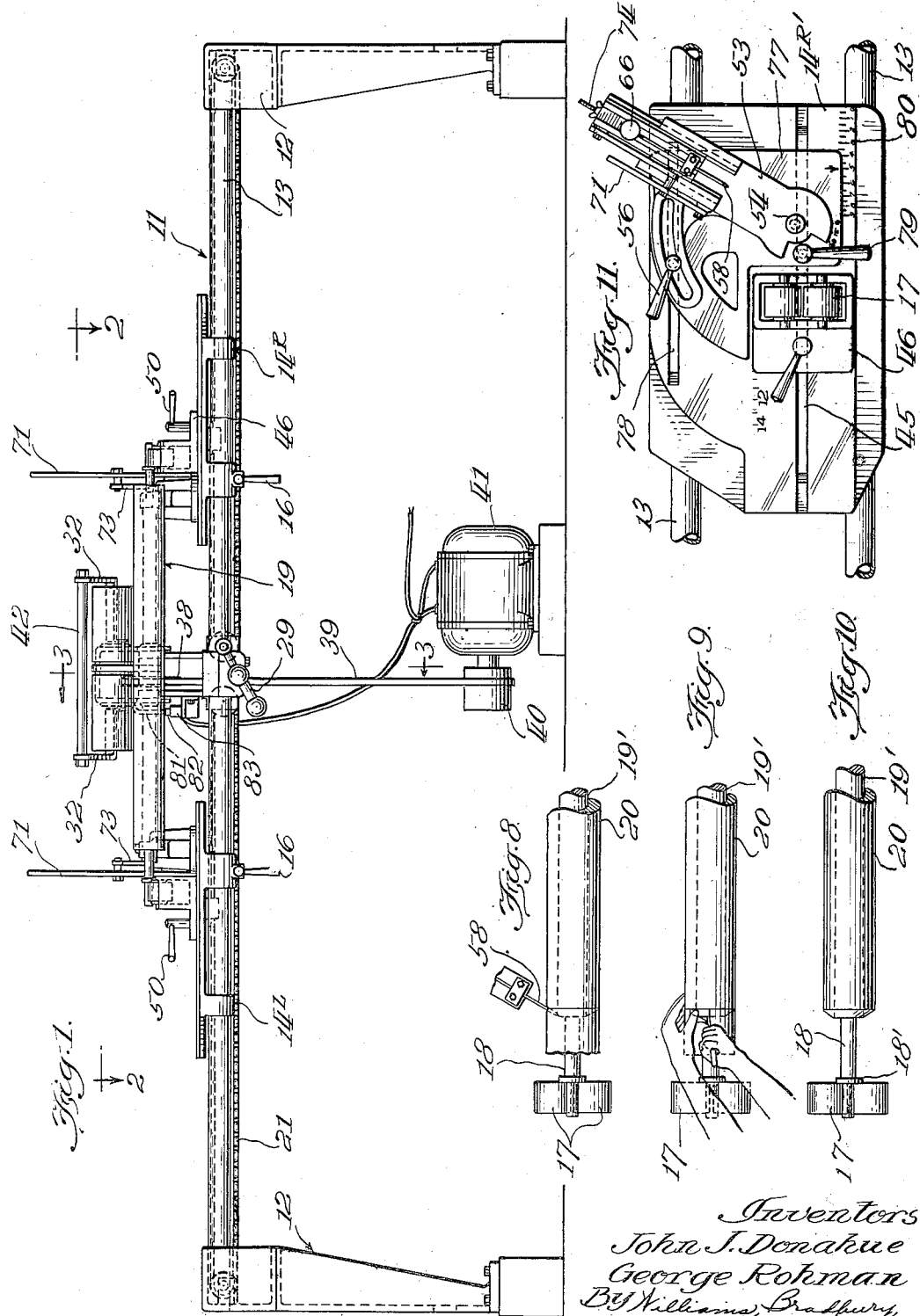

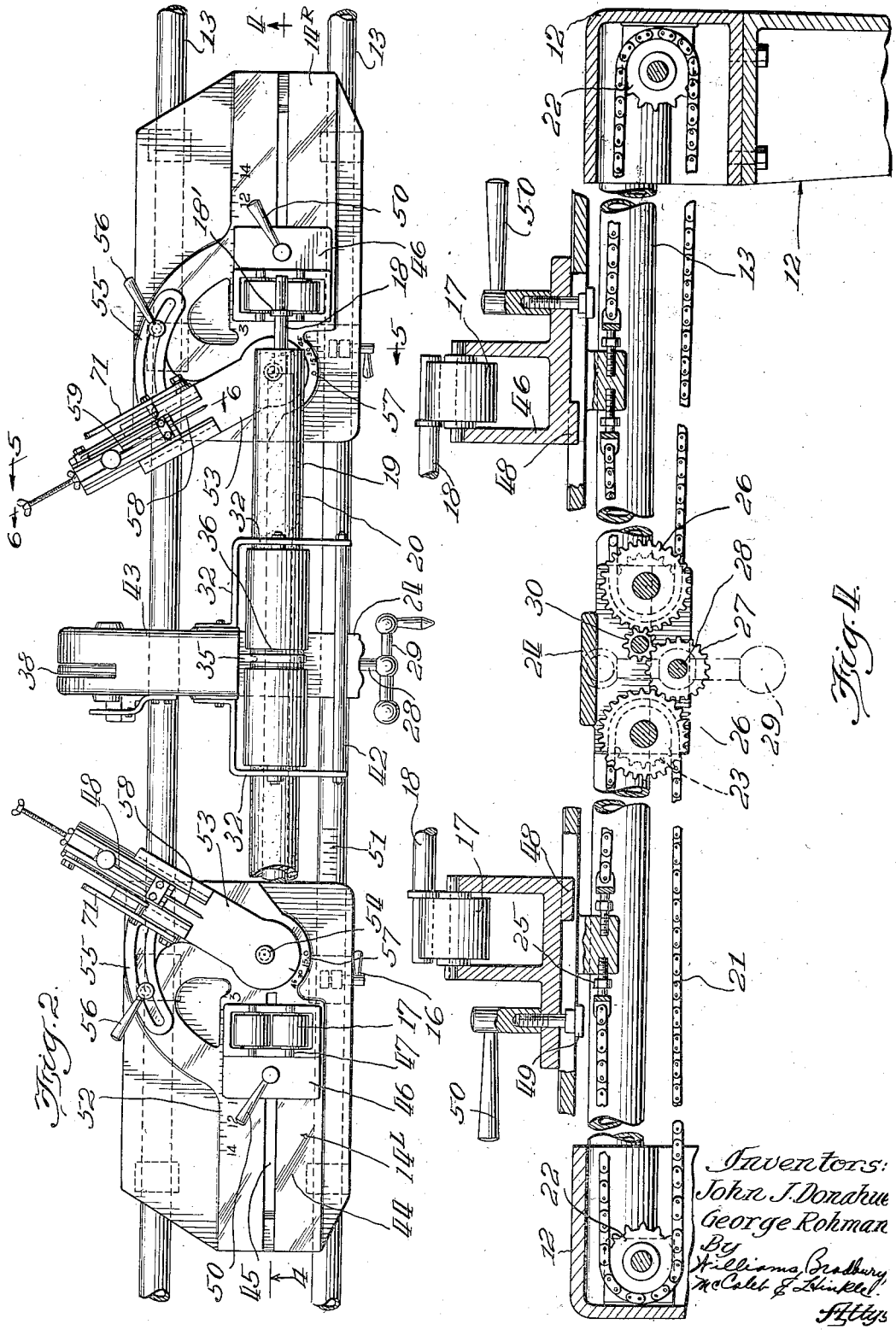

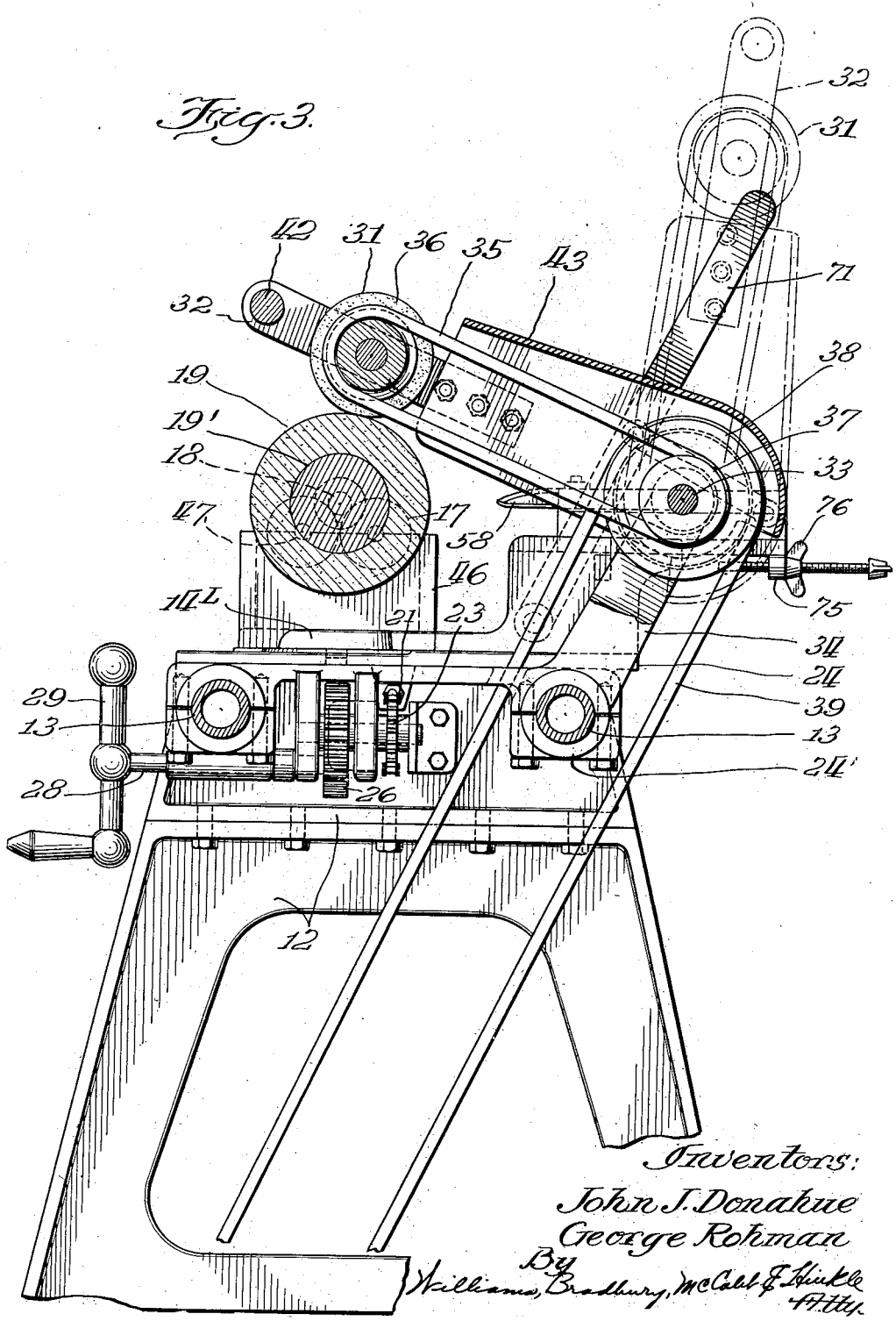

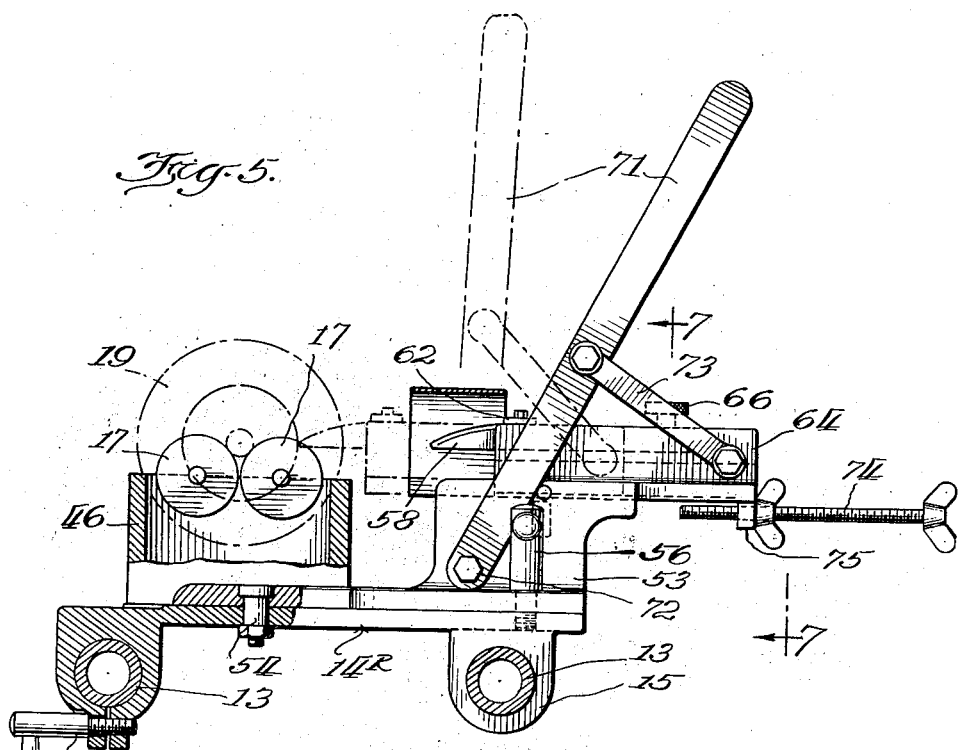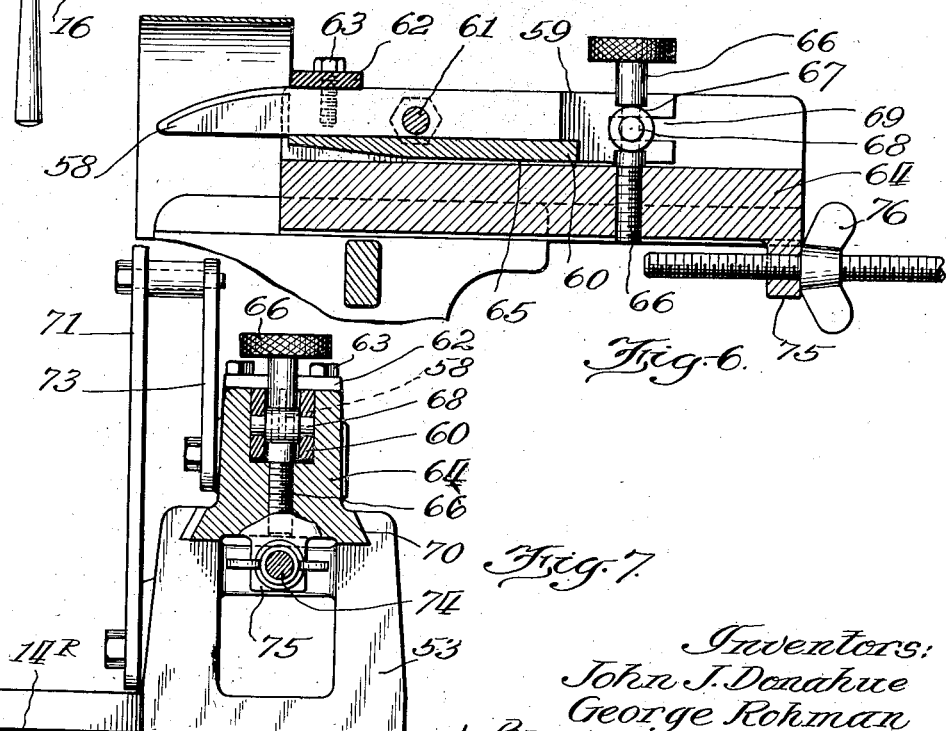

2,054,365

UNITED STATES PATENT OFFICE 2,054,365

TRIMMER FOR PRINTERS' ROLLERS

John J. Donahue, Kansas City, and George Rohman, St. Louis, Mo., assignors to Sam'l Bingham's Son Mfg. Co., Chicago, Ill., a corporation of Illinois Application October 16, 1935, Serial No. 45,232

12 Claims. (Cl. 82—2)

Our invention relates to a trimmer for printers' rollers, that is, a machine for trimming to the desired length and contour the ends of the cylindrical layer of composition after it is molded upon the usual shaft or shaft and core.

Among the objects of our invention are: The automatic centering of the position of the cutting knives whereby the trimmed composition will be properly centered in relation to the bearing ends of the roller shaft; ready adjustability of the angle of the trimmer, to provide the desired conical angle for the trimmed ends; an improved drive for the roller being trimmed; an improved guideway and operating mechanism for the trimming knives; an improved adjustable stop for the cutting knives; the quick and ready placement of the roller in, and removal from, the trimming machine; and a convenient reference gage for indicating the settings of the bearings for the roller and of the knives.

The foregoing, together with further objects, features and advantages of our invention, are set forth in the following description of a specific embodiment thereof, as illustrated in the accompanying drawings, wherein:

Fig. 1 is a front elevation of a trimming machine embodying our invention;

Fig. 2 is a plan view thereof, taken on the line 2—2 of Fig. 1;

Fig. 3 is a transverse vertical central section of the machine on an enlarged scale, taken on the line 3—3 of Fig. 1;

Fig. 4 is a longitudinal vertical section through the trimming machine, taken on the line 4—4 of Fig. 2, with portions broken away, and illustrating the mechanism for reciprocating the cutter carriages;

Fig. 5 is a vertical section through the machine showing a cutter and its carriage in side elevation, taken on the line 5—5 of Fig. 2;

Fig. 6 is a vertical section along the cutter and its way, taken on the line 6—6 of Fig. 2;

Fig. 7 is a transverse vertical rear section through a cutter unit, taken on the line 7—7 of Fig. 5;

Figs. 8, 9, and 10 are fragmentary plan views of one end of a roller showing the steps in trimming it on our machine, and Fig. 11 is a plan view of a modified form of carriage, comparable with the left-hand end of Fig. 2.

The trimming machine here shown is built upon a lathe-like bed which comprises end frame members 12 constituting legs, and a pair of spaced longitudinal rails 13 which constitute a way for carriages 14L and 14R which are mounted to slide upon the tubular rails 13 by bearings 15, one bearing 15 of each carriage being split and adapted to be locked by a clamping screw 16. As will later be described, bearing rollers 17 are provided on the carriages for journaling the protruding ends of the roller shaft 18 of the roller 19 which comprises a shaft 18, having reduced ends leaving a central portion 19' of larger diameter, and a cylindrical composition layer 20. The shaft and its core are supported centrally of a cylindrical mold and the cylindrical layer 20 of composition is formed thereabout. The purpose of our machine is to trim the excess length of composition thus molded upon the shaft and core.

As printers' rollers come in various lengths, our trimming machine is made adjustable to provide for the varying factors of the longitudinal distance between the shoulders 18' of the shaft, which define the inner ends of the journal portion of the shaft ends and to provide for the varying distances of the end of the trimmed composition from the journaling portion of the shafts, as well as for varying lengths of the composition layer after trimming.

In practically all instances the rollers are to be uniform at both ends and for this purpose it is desirable to center the respective carriages 14L and 14R upon the machine, as they are adjusted for different lengths of rollers. For facilitating this centering and for doing so automatically, we provide a chain 21 for each carriage 14L and 14R. Each chain 21 passes over an idling sprocket 22 mounted in the adjacent end frame 12 and the chain also passes over a drive sprocket 23 which is journaled in the center frame member 24 of the machine. The ends of the chain are attached to a suitable depending lug on the associated carriage and made adjustable, for tensioning the chain, by studs 25 which screw into a portion of the carriage. Each drive sprocket 23 is associated with a sprocket gear 26 which turns therewith. In the instance of the sprocket which reciprocates the left-hand carriage 14L, the sprocket gear 26 is driven directly by a pinion 27 while in the instance of the sprocket gear 26 associated with the right-hand carriage 14R, the sprocket gear 26 is driven by the pinion 27 through a reversing pinion 30. The pinion 27 is carried by a shaft 28 journaled in the center frame member 24 and is rotated by a crank handle 29. Thus, when the operator turns the hand crank 29 clockwise (Fig. 4), the left-hand chain is driven to move the carriage 14L outwardly, that is, to the left while, because of the reversing pinion 30, the right-hand chain is moved in the opposite direction to slide the right-hand carriage 14R to the right, whereby both carriages are moved outwardly.

To mount a roller to be trimmed upon the machine, the hand crank 29 is turned to bring pairs of rollers 17 to the correct spacing as determined by the shoulders 18' on the roller shaft and then the roller is merely set in place with the journaling ends of the rollers in the V formed by the adjacent upper arcs of the rollers 17. For rotating the roller so that the cutting knives, later described, may operate somewhat after the fashion of the cutting tools on lathes, we provide a center drive for the roller, which minimizes any tendency of the drive to work the journaling ends of the shaft out of their proper relation with their shaft 17. Our central drive for turning the roller is accomplished by a friction drum 31 which is mounted parallel with the roller and positioned to engage the uppermost surface of the roller, as best shown in Fig. 3. The friction drum is rotatably mounted in a journaling arm 32 which is pivoted by a shaft 33 to the upper end of a drive bracket 34 which extends upwardly from the rear of the center frame 24, the center frame 24 it will be understood being mounted on the tubular rails 13 by split cylindrical clamps 24', as shown in Fig. 3. The friction drum 31 is rotated by a drum belt 35 which passes around a pulley-like groove 36 in the drum. The drum belt 35 also passes around a pulley 37 on the shaft 33. The pulley 37 is mounted to turn with an associated pulley 38 and the latter is driven by a belt 39 from the pulley 40 of an electric motor 41 located beneath the machine. The forward cross bar 42 of the journaling arm 32 constitutes a handle whereby the arm, together with the drum, may be swung upwardly to the dotted line position of Fig. 3 without affecting the drive of the friction drum 31 by the motor. If desired, the arm 32 for mounting the friction drum 31 may include a shell-like guard 43 for the belt 35 and the pulleys 37 and 38.

As will now be described, each of the carriages 14L and 14R carries the pair of journaling rollers 17 previously mentioned, and an adjustably positioned cutting knife.

Each carriage presents a table surface 44 longitudinally traversed by a slot 45 upon which is slidably mounted a sub-carriage 46. The sub-carriage has a box-like upper portion provided with bearing notches 47 for the trunnion of the bearing rollers 17. On its lower side each sub-carriage 46 carries a guide lug 48 which extends into the slot 45 for slidably positioning the sub-carriage, and each sub-carriage may be locked against movement along the slot 45 by a clamping bolt 49 and associated clamping nut 50, as shown in Figs. 2 and 4. The spacing of the carriages 14L and 14R may be determined by the gage marks 51 on one of the rails 13, while the position of each sub-carriage 46 in reference to its associated carriage 14L or 14R may be determined by the gage markings 52 on the table surface 44 of the carriage. A knife-carrying arm 53 is associated with each carriage 14L, 14R, and is pivotally mounted on the carriage by a pivot pin 54 (Fig. 5). Each arm 53 carries an integral slotted bracket 55 arcuate about the pivot 54. A clamping screw 56 passes through the slot in the bracket 55 for securing the arm 53 in the desired angular position, as may conveniently be read from gage markings 57. This is for determining the angle at which the roller is trimmed.

Each knife-carrying arm 53 is arranged to slidably support a cutting knife 58 for reciprocation toward and from the roller at an angle determined by the angular setting of the arm 53. The knife 58 is arranged to move in a straight path which intersects the axis of the pivot pin 54 at substantially the elevation of the axis of the roller to be trimmed. The shank of the cutting knife 58 is inserted in a vertical slot 59 which extends longitudinally in a square holder bar 60. The blade may be inserted endwise or through the open top of the slot 59 and is locked in position by a cross pin 61 and further held down by a cross strap 62 and clamping screws 63. The bar 60 is, in turn, received in the slot of a channel-shaped knife carriage 64 and pivotally mounted therein by the previously mentioned cross pin 61. A clearance 65 is left between the bottom of the bar 60 and the slot in the channel-shaped carriage which receives it. This clearance permits a limited rocking movement of the bar and knife about the pivot pin 61. This rocking is under the control of an adjustable elevating screw 66, the lower end of which is threaded into the knife carriage 64. A reduced intermediate portion 67 of the elevating screw 66 passes through the vertical cross bore of a trunnion member 68, whose trunnioned ends extend into horizontal slots 69 cut from the rear ends of the vertical bifurcations of the rearward end of the bore 60. By turning the knurled end of the elevating screw 66, the operator may rock the bar 60 and knife 58 about the pivot pin 61 slightly to elevate or depress the point of the knife 58, as required to compensate for larger or smaller diameters of the bearing or trunnion ends of the shaft of the roller being trimmed.

The bottom edge of the knife carriage 64 is dovetailed into a way 70 formed in the upper and rearward end of the knife-carrying arm 53. This way 70, which is aligned with the axis of the pivot pin 54, provides for supporting and guiding the knife for reciprocation toward and from the roller at the desired angle to the axis of the roller. For reciprocating the knife, a knife-reciprocating lever 71 is pivoted at 72 on the arm 53 and at its upper end has a handle portion. Intermediate the pivot and the handle portion the lever 71 is connected to the knife carriage 64 by a link 73. An adjustable limiting stop for the forward movement of the knife and its carriage 64 in the way 70 of the arm 53 is provided by a stop screw 74 threaded through a lug 75 which depends from the knife carriage 74 and engages the rearward end of the arm 53 adjacent the way 70, as shown in Figs. 5 and 6, to stop the knife carriage. The adjusted position of the stop screw 74 is maintained by the aid of a locking thumb screw 76.

The operation of our trimming machine is as follows: The hand crank 29 is turned to move the chains 21 and thereby slide the carriages 14L and 14R to such a spacing as indicated by the guide markings 51 as will bring the axes of the pivots 54 to the same spaced distance apart as the length of the enlarged portion 19' of the roller shaft 18, it usually being desired that the trimmed end of the composition terminate at the ends of the enlarged portion 19' of the shaft. Then the clamping screws 50 are loosened and the sub-carriage 46 is moved in reference to the pivot 54 of each carriage so that the journaling rollers 17 are spaced apart appropriately to the distance between the shoulders 18' of the roller shaft. The distance between the pivot 54 and the adjacent ends of the journaling roller 17 is determined for setting by the gage markings 52. With the friction drum 31 swung upwardly to the dotted line position of Fig. 3, to provide free access, the roller is set into the trimming machine with the journaling ends of the shaft in the respective pairs of journaling rollers 18. The shoulders 18' cooperate with the ends of the journaling rollers to hold the roller against axial movement.

The clamping screws 56 are then loosened and the knife-carrying arms 53 are swung to the desired angle as indicated by the gage markings 57 and then the screws 56 are clamped down to lock the arms 53 in the desired angular position. Their angular position determines the angle of the cone in which the composition is to be trimmed. The motor 41 is then started to drive the friction drum 31 and the handle 42 is pulled downwardly to the full line position of Fig. 3 so that, under the weight of the arm 43, the friction drum 31 engages the surface of the composition of the roller to rotate the roller. If necessary, the elevating screws 66 are turned to rock the knives 58 about their pivots 61 on the knife carriages 64 to bring the points 58 in the same horizontal plane with the axis of the roller. Then the operator pulls the handle portion of one of the levers 71 forwardly to slide the knife and the knife carriage forwardly along the way 70 in the arm 53 to form a conical cut in one end of the composition layer, as indicated in Fig. 8. The stop screw 74 prevents the point of the knife actually engaging and being dulled by the metal of the roller shaft. The handle of the other lever 71 is similarly pulled forwardly to cause its associated knife to make a similar conical cut in the other end of the roller composition layer.

After the conical cut has thus been made at each end and the cutting knives moved to their rearward position, the operator manually cuts the composition outwardly of the conical cut, along a radial plane as indicated in Fig. 9, cutting down to the shaft. This transforms the excess end of the roller composition into a split ring which may easily be removed by hand, leaving the trimmed conical end shown in Fig. 10. This operation is performed on both ends of the roller and the trimming is thus completed.

The pivot 54, as can be seen from Figs. 2 and 5, is offset rearwardly from the vertical plane of the axis of the shaft by a distance approximately that of the radius of the journaling ends of the roller shaft. This is advisable because, for varying angles of the trimming, the conical cut should terminate at the periphery of the shaft rather than the axis of the shaft.

In Fig. 11 I have shown a modified form of carriage which may be embodied in both the left and right-hand carriage, although I have illustrated only such a modified right-hand carriage 14R'. Here the journaling rollers 17 may be carried non-adjustably upon the carriage 14R', but I have shown the adjustable sub-carriage 46 for the journaling rollers. The knife-carrying arm 53, however, is not pivoted directly to the carriage 14R', but to an intermediate supporting plate 77 which is reciprocably mounted on the carriage 14R' by the aid of the slot 45 and an auxiliary slot 78 parallel therewith. The intermediate plate 77 may be locked in position by a clamping screw 79, with its adjusted position read upon the gage markings 80 on the carriage 14R'. In the operation of the modification of Fig. 11, the setting of the sub-carriage 46 on the carriage 14R' may remain fixed and the hand crank 29 is turned to reciprocate the carriages for the proper spacing of the journaling rollers 17. Then the intermediate plates 77 are moved the correct distance from the journaling rollers 17 as indicated by the gage markings 80, and then clamped in that position by the clamping screws 79 and then the correct angular setting of each knife-carrying arm 53 is obtained by swinging the arm about the pivot 54 and locking it by the clamping screw 56 to the intermediate plates 77.

If desired, instead of using a separately controlled switch for starting the motor, an automatic switch may be provided for closing the circuit of the motor 41 when the friction drum 31 is swung downwardly from its upper dotted line position of Fig. 3. We have shown such an automatic switch which comprises an actuating arm 81 (Fig. 2) in the form of a bracket attached to the side of the drum-carrying arm 32 or its guard portion 43 which, when the arm is swung downwardly, engages the circuit closing button 82 of a control switch 83 for the circuit of the motor (Fig. 1).

Our trimming machine permits a faster, more accurate and neater trimming than can be accomplished by the hand trimming which has been the practice, and our machine is readily adjustable to take the varying lengths of rollers, the varying diameters of the roller composition and of the journaling ends of the shafts, the varying distances between the journaling ends of the shafts and the trimmed ends of the composition, and the varying angles of trim.

After the trimming has been performed on our machine, the machine may be used for journaling and rotating the roll for the usual finishing operation which consists of passing a gas torch over the surface of the composition to give it the final smooth finish. In flame treating that portion of the roller which would be engaged by the driving friction drum, the friction drum is swung to its upper position and the roll rotated by hand for completing the heat treatment at that region.

We claim:

1. A trimming machine for the composition layer of printers' rollers, comprising a frame constituting a way, a pair of carriages reciprocably mounted thereon, means on each carriage for journaling an end of the shaft of a roller to be trimmed, a knife mounted on each carriage for movement toward the roller for trimming an end of the composition, and a friction drum mounted on the frame for movement to and from the roller, the drum engaging the surface of the composition for driving the roller.

2. A trimming machine for the composition layer of printers' rollers, comprising a frame constituting a way, a pair of carriages reciprocably mounted thereon, means on each carriage for journaling an end of the shaft of a roller to be trimmed, means for simultaneously moving the carriages together and apart, a knife mounted on each carriage for movement toward the roller for trimming an end of the composition, and a friction drum mounted on the frame for movement to and from the roller, the drum engaging the surface of the composition for driving the roller.

3. A machine for trimming the excess composition from the ends of printers' rollers, comprising a way, a pair of carriages mounted on the way, a central frame member intermediate the carriages, a sprocket journaled at each end of the frame, a pair of sprockets journaled on the center frame members, a chain extending over each end sprocket and the adjacent sprocket on the center member and anchored to the adjacent carriage, means for simultaneously turning the sprockets to move the chains for reciprocating the carriages in opposite directions, means on each carriage for journaling the adjacent end of the shaft of the roller, a cutting knife mounted on each carriage for movement toward the axis of the roller for trimming the excess composition therefrom, and means for rotating the roller.

4. A trimming machine for printers' rollers, comprising means for journaling the roller, a cutting knife mounted adjacent the end of each roller for movement toward the shaft of the roller for trimming the excess composition from the end of the roller, means for driving the roller comprising a friction drum, an arm for journaling the drum, means for pivotally mounting the arm, a pulley journaled concentrically with the pivot for the arm, pulley means on the friction drum, a belt passing over the pulley and the pulley means on the friction drum for driving the drum, and means for driving the pulley whereby the arm may be swung upwardly to move the drum from a roller-engaging position to an upper idling position.

5. A trimming machine for a printers' roller having an axially protruding shaft, comprising a bed providing a way, a carriage reciprocable upon the way parallel with the roller being trimmed, journaling rollers carried by the carriage for journaling one end of the shaft of the roller, means for journaling the other end of the shaft of the roller, means for rotating the roller, a knife for trimming the excess composition at the end of the roller, and means on the carriage for mounting the knife for movement toward the axis of the roller.

6. A trimming machine for a printers' roller having an axially protruding shaft, comprising a bed providing a way, a carriage reciprocable upon the way parallel with the roller being trimmed, journaling rollers carried by the carriage for journaling one end of the shaft of the roller, means for journaling the other end of the shaft of the roller, means for rotating the roller, a knife for trimming the excess composition at the end of the roller, means on the carriage for mounting the knife for movement toward the axis of the roller, and means for adjusting the angle of the direction of movement of the knife toward the roller.

7. A trimming machine for a printers' roller having an axially protruding shaft, comprising a bed providing a way, a carriage reciprocable upon the way parallel with the roller being trimmed, journaling rollers carried by the carriage for journaling one end of the shaft of the roller, means for journaling the other end of the shaft of the roller, means for rotating the roller, a knife for trimming the excess composition at the end of the roller, means on the carriage constituting a way, a knife carrying bar reciprocably mounted in the way for movement toward the roller, and a knife carried by the bar for trimming the excess composition from the end of the roller.

8. A trimming machine for a printers' roller having an axially protruding shaft, comprising a bed providing a way, a carriage reciprocable upon the way parallel with the roller being trimmed, journaling rollers carried by the carriage for journaling one end of the shaft of the roller, means for journaling the other end of the shaft of the roller, means for rotating the roller, a knife for trimming the excess composition at the end of the roller, means on the carriage constituting a way, a knife-carrying bar reciprocably mounted in the way for movement toward the roller, and a knife carried by the bar for trimming the excess composition from the end of the roller, the knife being pivotally mounted in the bar for rocking to adjustable positions to vary the elevation of the cutting edge of the knife.

9. A trimming machine for a printers' roller having an axially protruding shaft, comprising a frame, a way thereon parallel with the axis of the roller to be trimmed, a carriage reciprocable on the way, a sub-carriage adjustable on the carriage in a direction parallel with a roller to be trimmed, bearing means on the sub-carriage for journaling one end of the shaft of the roller to be trimmed, means for journaling the other end of the shaft of the roller, means for driving the roller, an arm pivotally mounted on the carriage about an axis substantially intersecting that of the roller, means for arcuately adjusting the arm upon the carriage about said pivot, a cutting knife for trimming the excess composition from the adjacent end of the roller, and means on the arm for reciprocating the knife for movement toward the axis of the pivot.

10. A trimming machine for a printers' roller having an axially protruding shaft, comprising a frame, a way thereon parallel with the axis of the roller to be trimmed, a carriage reciprocable on the way, bearing means on the carriage for journaling one end of the shaft of the roller, means for journaling the other end of the shaft of the roller, means for driving the roller, an intermediate or sub-carriage member, a way on the carriage for mounting the sub-carriage member for reciprocation parallel with the axis of the roller, an arm pivoted on the sub-carriage member about a pivot whose axis substantially intersects that of the roller, a way on the arm, a knife reciprocably mounted on the way in the arm for movement toward the pivot to cut the excess composition from the adjacent end of the roller, and means for reciprocating the knife.

11. A trimming machine for a printers' roller having an axially protruding shaft, comprising a frame, a way thereon parallel with the axis of the roller to be trimmed, a carriage reciprocable on the way, bearing means on the carriage for journaling one end of the shaft of the roller, means for journaling the other end of the shaft of the roller, means for driving the roller, an intermediate or sub-carriage member, a way on the carriage for mounting the sub-carriage member for reciprocation parallel with the axis of the roller, an arm pivoted on the sub-carriage member about a pivot whose axis substantially intersects that of the roller, a way on the arm, a knife reciprocably mounted on the way in the arm for movement toward the pivot to cut the excess composition from the adjacent end of the roller, means for reciprocating the knife, and means for locking the arm to the sub-carriage member at adjusted angular positions whereby the angle of trim may be varied.

12. A trimming machine for a printers' roller having an axially protruding shaft, comprising a frame providing a way parallel with the roller, a carriage reciprocable upon the way, a journal carried by the carriage for one end of the roller shaft, means for journaling the other end of the roller shaft, means for rotating the roller, a knife for trimming excess composition at one end of the roller, and means on the carriage for mounting the knife for movement toward the axis of the roller.

JOHN J. DONAHUE.
GEORGE ROHMAN.